JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

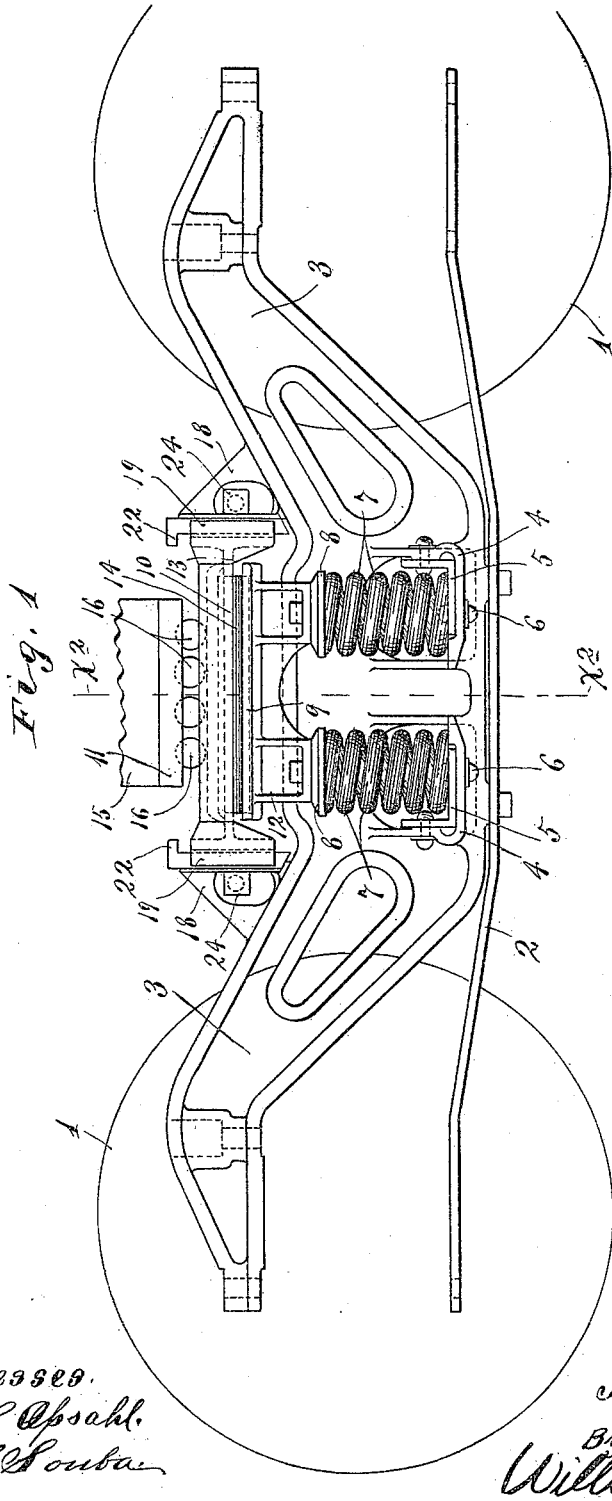

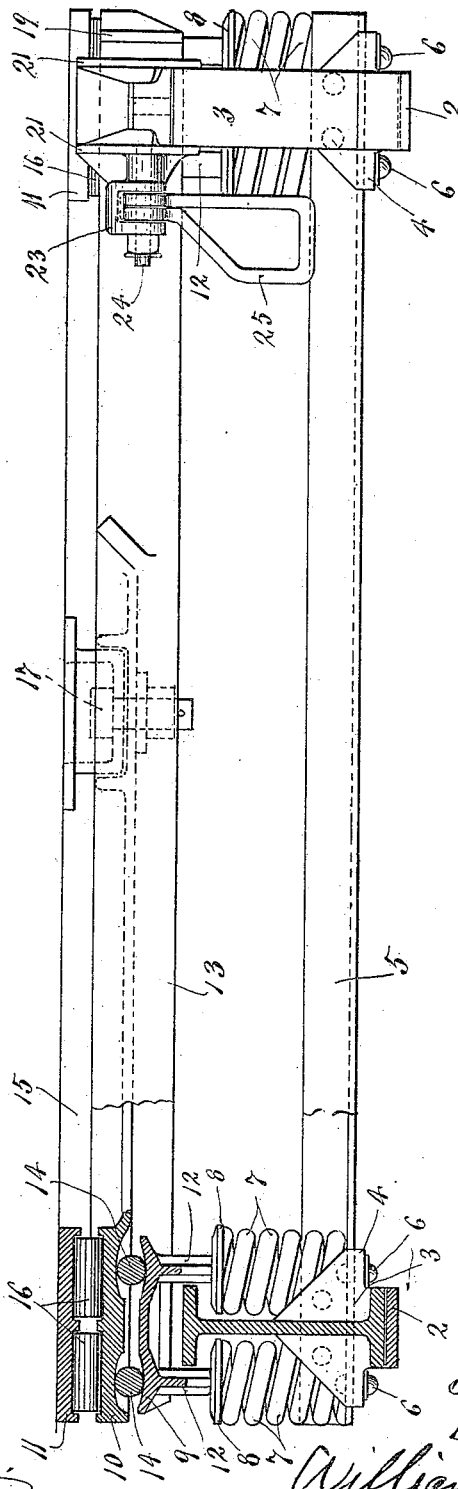

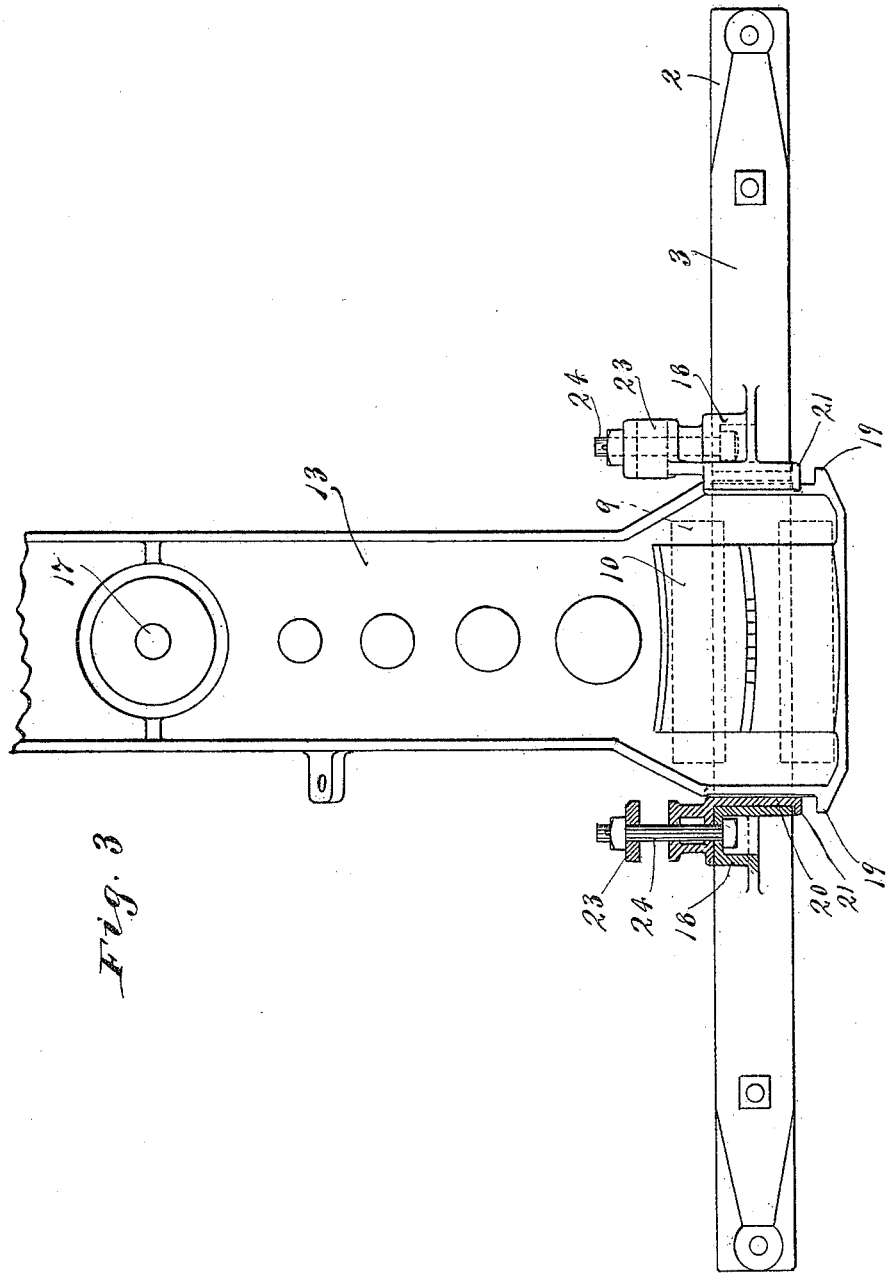

CAR-TRUCK.

963,978.	Specification of Letters Patent.	Patented July 12, 1910.

Application filed February 21, 1910. Serial No. 545,102.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My present invention has for its object to provide an improved car truck and is particularly directed to the improvement of car trucks of the type disclosed and claimed in my prior Patent No. 875,565, of date December 31st, 1907.

To the above ends, the invention consists of the novel devices and combinations of devices hereinafter described and defined in the claims.

In the accompanying drawings which illustrate the invention, like characters indicate like parts throughout the several views.

Referring to the drawings, Figure 1 is a view in side elevation with some parts removed and some parts broken away, showing the improved car truck; Fig. 2 is a view partly in elevation and partly in transverse vertical section on the line $x^2$ $x^2$ of Fig. 1, the truck wheels and certain other parts of the truck being removed; and Fig. 3 is a plan view showing approximately one half of the truck frame and truck bolster, some parts being sectioned.

The truck wheels 1 are indicated diagrammatically only in Fig. 1.

The numeral 2 indicates one of the bottom tie bars and the numeral 3 one of the cast steel girder-type side frames. This side frame casting 3 has cast integral therewith inner and outer spring supporting brackets 4, located on opposite sides of the central web of the said frame casting. Immediately above said inner and outer brackets 4, the central web of the frame casting 3 is cut away to afford a clearance for the projecting ends of the two transoms or cross ties 5, shown as of angle iron formed with their vertical and horizontal flanges riveted to the vertical and horizontal flanges, both of the inner and outer brackets 4.

The construction so far described is substantially that of my said prior patent with this important difference,—that the transoms or cross ties are extended completely through the frame castings 3 and are riveted to the projecting brackets, both of the inner and outer sides thereof. This very greatly increases the rigidity of the truck structure.

Vertical rivets 6, which connect the horizontal flanges of the brackets 4, and the transoms 5 serve to center the lower ends of inner and outer pairs of coiled bolster-supporting springs 7, that rest, in part, upon the horizontal flanges of said transoms and, in part, directly upon the said brackets. Seated directly upon the upper ends of the springs 7 are spring caps 8. The numeral 9 indicates the lower member of three lateral motion roller bearing plates 9, 10 and 11, and this lower bearing plate is provided with four depending legs 12, that rest directly one upon each of the spring caps 8. The inner and outer pairs of legs 12 straddle the upper flange of the side frame casting 3 and hold the bearing plate 9 against movements transversely of the truck but permit free vertical movements of the same under yielding actions of the springs. The intermediate bearing plates 10 are formed integral with or cast as a part of the truck bolster 13.

Lateral motion rollers 14, which extend longitudinally of the truck side frames, are interposed between the lower bearing plates 9 and the intermediate bearing plates 10, and the said bearing plates are provided with concave roller seats which tend to hold the said bearing plates 10 and the truck bolster in centered or intermediate positions transversely of the truck.

The upper bearing plates 11 are rigidly secured to the car or body bolster 15, and rollers 16 are interposed between the flat parallel surfaces of the said bearing plates 10 and 11. These rollers 16 permit radial or horizontal pivotal movements of the truck in respect to the car body and, hence, are disposed substantially radial in respect to the pivotal connection 17 between the said body bolster 15 and the truck bolster 13. From what has been said, it is evident that the intermediate bearing plates 10, which are formed integral or as part of the end portions of the truck bolster, are provided directly on their lower surfaces with seats for engagement with the lateral motion rollers 14, and are formed directly on their upper surfaces with flat bearing surfaces for engagement with the radial motion rollers 16. In this respect, the present truck differs specifically from my said prior patent, the drawings of which disclose two bearing plates constructed separately and independently of the truck bolster and rigidly secured thereto by rivets.

Bolster guiding lugs or stub columns 18, which are preferably not necessarily cast integral with the frame castings 3, are arranged in pairs for guiding the vertical movements of the ends of the truck bolster 13. By reference to Fig. 3, it will be noted that the end portions of the truck bolster are widened to provide for seats for the rollers 14, that are longer than the width of the body portion of the said truck bolster, and at its extreme end, the said bolster is provided with laterally projecting stop shoulders 19.

Chafing plates 20 are rigidly but detachably secured to the inner faces of the bolster guiding lugs 18 and afford replaceable wearing surfaces for engagement with the ends of the truck bolster. At their outer edges, the chafing plates 20 are provided with stop flanges 21, that engage the outer edges of the guide lugs 18, and at their upper extremities, they are provided with stop lugs or shoulders 22, that limit the upward movement of the truck bolster and prevent the truck bolster from being thrown from an inoperative position by the springs 7, even when the truck bolster is relieved from its normal load. The chafing plates 20, in fact, constitute supplemental parts of the bolster guiding lugs and, preferably, they are cast integral with brake hanger lugs 23, through which and the guide lugs 18, nutted bolts 24 are passed with their heads countersunk into the recess formed in the said lugs, especially shown in Fig. 3. The numeral 25 at the right of Fig. 2 indicates one of the brake beam hanger straps, which is pivotally attached to the coöperating brake hanger brackets or lugs 23 by the bolt 24.

What I claim is:

1. In a car truck, the combination with side frames and transoms extended through and rigidly secured to said side frames, of springs seated on said transoms, one pair inside and one pair outside of each side frame, and combined spring caps and roller bases embracing said side frames and supported on said inner and outer pairs of springs, substantially as described.

2. In a car truck, the combination with side frame castings, of transoms extended through openings in the webs of said frame castings and secured to said castings at points, both on the inner and outer sides thereof, springs supported in pairs on said transoms, a truck bolster guided by said side frames, combined spring caps and roller bases embracing said side frames and supported on said springs, and rollers interposed between said bolster and underlying combined spring caps and roller bases, substantially as described.

3. In a car truck, the combination with side frame castings having integrally formed upwardly extended bolster guide lugs, of chafing plates detachably secured to said guide lugs and provided at their upper extremities with separated bolster stops, and a truck bolster spring supported on said side frame castings and directly engageable with said chafing plates and limited in its upward movement by the stops of the latter, substantially as described.

In testimony whereof I affix my signature in presence of two witnesses.

JOHN C. BARBER.

Witnesses:
F. L. BARBER,
A. M. LOVE.